United States Patent [19]

Johnson

[11] Patent Number: 5,751,490
[45] Date of Patent: May 12, 1998

[54] DUAL REFLECTIVE ELEMENT VEHICLE SIDE VIEW MIRROR ASSEMBLY

[76] Inventor: Esther T. Johnson, 6550 Logan Rd., Mobile, Ala. 36695

[21] Appl. No.: 739,520

[22] Filed: Oct. 29, 1996

[51] Int. Cl.$^6$ .............. G02B 5/08; G02B 7/182; B06R 1/06
[52] U.S. Cl. .............. 359/605; 359/607; 359/840; 359/872
[58] Field of Search .............. 359/605, 606, 359/607, 608, 840, 865, 872

[56] References Cited

U.S. PATENT DOCUMENTS

| | | | |
|---|---|---|---|
| 1,887,706 | 11/1932 | Bettman | 359/840 |
| 2,307,532 | 1/1943 | Murphy | 359/607 |
| 2,741,156 | 4/1956 | Barkley | 359/607 |
| 2,821,115 | 1/1958 | Weinrich et al. | 359/607 |
| 2,989,896 | 6/1961 | Bertell | 359/607 |
| 3,404,935 | 10/1968 | Creager | 350/303 |
| 3,476,464 | 11/1969 | Clark | 350/299 |
| 3,810,690 | 5/1974 | Klein et al. | 359/607 |
| 4,114,986 | 9/1978 | Marcus | 359/607 |
| 4,486,075 | 12/1984 | Cohen | 359/865 |
| 4,921,337 | 5/1990 | Hou | 350/604 |
| 5,107,375 | 4/1992 | Fisher | 359/850 |

FOREIGN PATENT DOCUMENTS

| | | | |
|---|---|---|---|
| 0249519 | 9/1966 | Austria | 359/840 |
| 0644990 | 9/1964 | Belgium | 359/840 |

Primary Examiner—Ricky D. Shafer
Attorney, Agent, or Firm—Joseph N. Breaux

[57] ABSTRACT

A dual reflective element vehicle side view mirror including a mirror housing; a dual element mirror having a first surface having a reflective element thereon and a second surface opposite to and parallel with the first surface having a second reflective element thereon that is covered by a tinted transparent material; and a mirror positioning mechanism including a rotating pin in connection with the dual element mirror for rotating the dual element mirror from a first position to a second position. The mirror housing has rotation cavity formed therein in connection with a mirror opening sized to allow the dual element mirror to be placed there across in a manner such that a gap exists between the entire perimeter edge of the housing defining the mirror opening and the perimeter side edges of the dual element mirror. The rotation cavity is sized to allow the dual element mirror to rotate at least one-hundred eighty degrees about an axis positioned across the mirror opening.

11 Claims, 2 Drawing Sheets

DUAL REFLECTIVE ELEMENT VEHICLE SIDE VIEW MIRROR ASSEMBLY

TECHNICAL FIELD

The present invention relates to side view mirrors for vehicles and more particularly to a side view mirror assembly for vehicles having a dual reflective element mirror rotatably mounted within a mirror housing and a mirror positioning mechanism for allowing a user to position either of the mirror elements into a use position by rotation of the dual reflective element mirror.

BACKGROUND OF THE INVENTION

Driving a vehicle at night can be dangerous because the side view mirrors of the vehicle can reflect the headlights lights from following vehicles into the eyes of the driver partially blinding or restricting the vision of the driver. It would be a benefit, therefore, to have a side view mirror assembly or a vehicle that included a reflective element for allowing a driver to view to the rear and side of his vehicle having a light intensity diminishing mechanism such as a tint to reduce the effect of reflected light shining into the eyes of the driver from a following vehicle. It would be a further benefit to have a side view mirror assembly for vehicles that included a tinted reflective element for use at night and a conventional reflective element for use during the day. It would also be a benefit if the side view mirror assembly included a mechanism for allowing the user to conveniently change between the tinted reflective element and the conventional reflective element of a dual reflective element mirror.

SUMMARY OF THE INVENTION

It is thus an object of the invention to provide a dual reflective element vehicle side view mirror assembly that includes a conventional reflective element and a tinted reflective element.

It is a further object of the invention to provide a dual reflective element vehicle side view mirror assembly that includes a reflective element positioning mechanism for allowing the user to conveniently change between a tinted reflective element and a conventional reflective element.

Accordingly, a dual reflective element vehicle side view mirror assembly is provided. The mirror assembly comprises a mirror housing; a dual element mirror having a first surface having a reflective element thereon and a second surface opposite to and parallel with the first surface having a second reflective element thereon that is covered by a tinted transparent material; and a mirror positioning mechanism including a rotating pin in connection with the dual element mirror for rotating the dual element mirror from a first position to a second position. The mirror housing has rotation cavity formed therein in connection with a mirror opening sized to allow the dual element mirror to be placed there across in a manner such that a gap exists between the entire perimeter edge of the housing defining the mirror opening and the perimeter side edges of the dual element mirror. The rotation cavity is sized to allow the dual element mirror to rotate at least one-hundred eighty degrees about an axis positioned across the mirror opening.

The mirror housing also includes a rotation pin aperture; a pair of spaced registration cavities, one positioned on either side of the rotation pin aperture; and a rotation pin seat. The rotation pin aperture is formed entirely through a sidewall of the mirror housing opposite from the mirror housing sidewall into which the rotation pin seat is formed. The rotation pin seat and the rotation pin aperture are concentrically aligned, formed adjacent to the perimeter of the mirror opening, and are centered along the mirror opening.

The dual element mirror includes a central support plate having a centered rotation pin passageway formed therethrough. The first and second reflective elements are attached to the central support plate.

The mirror positioning mechanism includes an elongated, rotation pin that is positioned through the rotation pin aperture of the mirror housing, through the rotation pin passageway of the central support plate and into the rotation pin seat in a manner such that dual element mirror is rotatable on the rotation pin. The mirror positioning mechanism also includes a registration plate secured to the central support plate having a rotation pin hole for allowing the rotation pin to be passed therethrough and into the rotation pin passageway and two spaced registration bumps on either side of the rotation pin hole. The registration bumps are spaced such that each registration bump is positioned within a respective registration cavity of the mirror housing when the dual element mirror is rotated on the rotation pin to a first position holding the dual element mirror in the first position.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
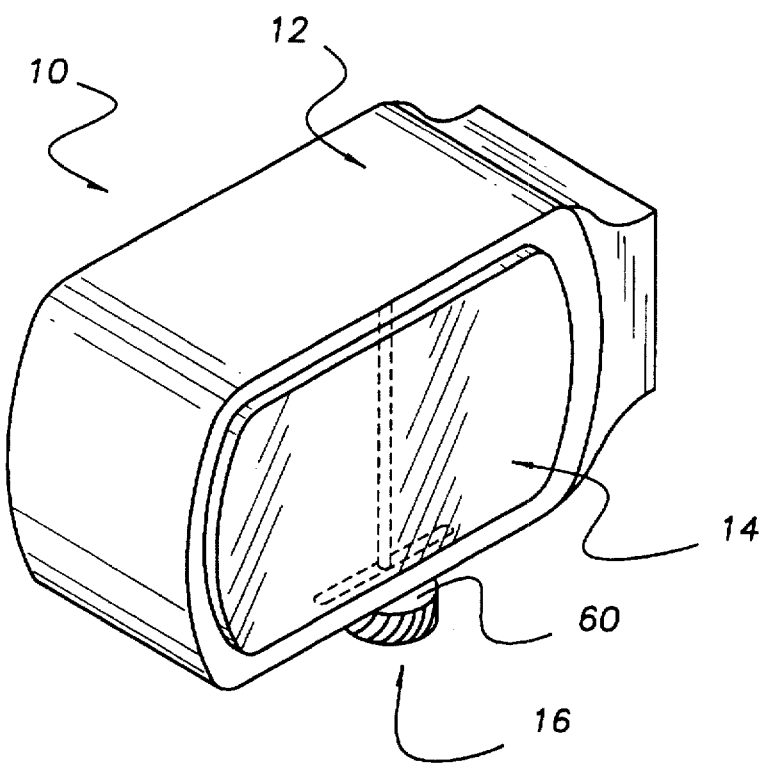
FIG. 1 is a perspective view of a first exemplary embodiment of the dual reflective element vehicle side view mirror assembly of the present invention showing the mirror housing, the dual element mirror, and the mirror positioning mechanism.

FIG. 1 shows a first exemplary embodiment of the dual reflective element vehicle side view mirror assembly of the present invention generally designated by the numeral 10. Mirror assembly 10 includes a mirror housing, generally designated 12; a dual element mirror, generally designated 14; and a mirror positioning mechanism, generally designated 16.

Figure 2:
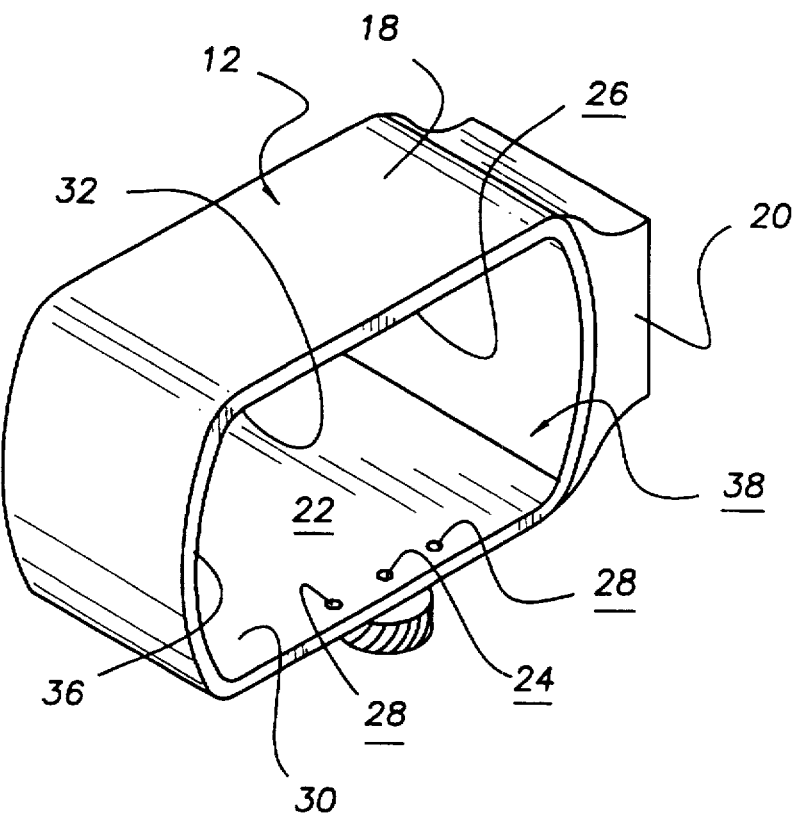
FIG. 2 is a perspective view of the mirror housing of the mirror assembly of FIG. 1 showing the rotation cavity and the rotation pin aperture, rotation pin seat, and the two registration cavities of the mirror positioning mechanism.

With reference to FIG. 2, mirror housing 12 is molded from plastic and includes an exterior surface 18 and a vehicle attachment section 20. A rotation cavity 22 is formed within mirror housing 12 that is sized to provide sufficient space to allow a portion of dual element mirror 14 (FIG. 1) to swing therethrough when rotated on a rotation pin. A rotation pin aperture 24, a rotation pin seat 26, and two registration cavities 28 are provided within the sidewalls of mirror housing 12 defining rotation cavity 22. Rotation pin aperture 24 is formed entirely through a sidewall 30 of mirror housing 12 that is opposite from a mirror housing sidewall 32 into which rotation pin seat 26 is formed. Rotation pin seat 26 is a cylindrical shaped blind bore. Rotation pin seat 26 and rotation pin aperture 24 are concentrically aligned, formed adjacent to the perimeter edge 36 of mirror housing 12 defining a mirror opening 38, and are centered along mirror opening 38.

Figure 3:
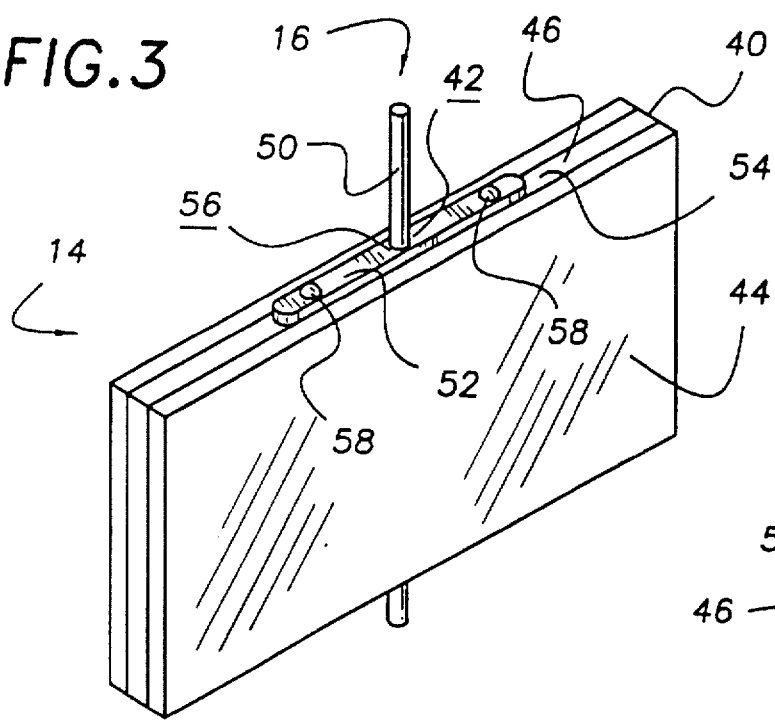
FIG. 3 is a perspective view of the dual element mirror including the conventional silvered mirror side, the central support plate and the tinted mirror side; and the rotation pin and the registration plate with the two registration bumps extending therefrom of the mirror positioning mechanism.
Figure 3A:
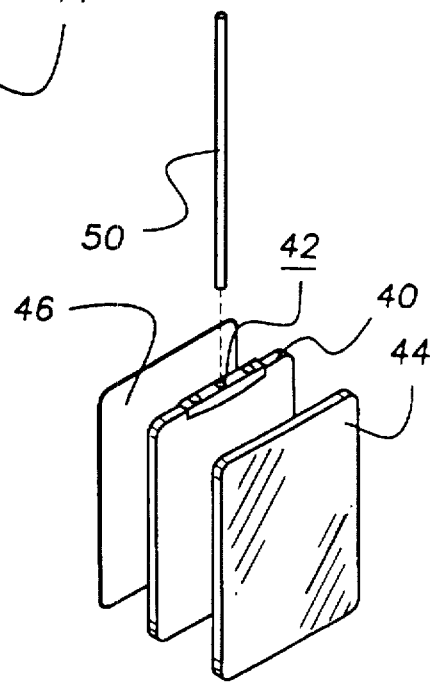
FIG. 3A is an exploded perspective view of the dual element mirror including the conventional silvered mirror side, the central support plate with the rotation pin passageway, the tinted mirror side, and the rotation pin withdrawn from the rotation pin passageway.

With reference to FIG. 3, dual element mirror 14 includes a substantially rectangular, flat, metal central support plate 40 having a centered rotation pin passageway 42 formed therethrough. A conventional, rectangular shaped, flat, silvered mirror forms the first reflective element 44. First reflective element 44 is adhesively secured to a flat side surface of central support plate 40. A flat, rectangular shaped, silvered mirror having a tinted glass exterior cover forms the second reflective element 46. Second reflective element 46 is adhesively secured to the second flat side surface of central support plate 40. With reference to FIG. 3A, although, first and second reflective elements 44,46 are adhesively secured to central support plate 40 in this embodiment, other methods such as the use of brackets surrounding the perimeters of first and second reflective elements 44,46 and central support plate 40 can also be used.

With reference once again to FIG. 3, mirror positioning mechanism 16 includes an elongated, metal rotation pin 50 of a length sufficient to allow rotation pin 50 to be positioned entirely through and past rotation pin passageway 42 of central support plate 40. A registration plate 52 is secured to the center of a lower side edge 54 of central support plate 40 having a rotation pin hole 56 for allowing rotation pin 50 to be passed therethrough and into rotation pin passageway 42. Two spaced registration bumps 58 extend from the outwardly facing surface of registration plate 52 on either side of rotation pin hole 56. Registration bumps 58 are spaced such that each registration bump 58 is positioned within a respective registration cavity 28 (FIG. 2) of mirror housing 12 when dual element mirror 14 is rotated on rotation pin 50 to a first position. In use, registration bumps 58 positioned within registration cavities 28 hold dual element mirror 14 in the first position.

With general reference to FIGS. 1-3, mirror assembly 10 is assembled by assembling dual element mirror 14 as previously described. Registration plate 52 is then adhesively secured to lower side edge 54 of central support plate 40 in a manner such that rotation pin hole 56 is in registration with rotation pin passageway 42. Dual element mirror 14 is then positioned within mirror opening 38 with rotation pin passageway 42 aligned between rotation pin aperture 24 and rotation pin seat 26. Rotation pin 50 is then inserted sequentially through, rotation pin aperture 24, rotation pin hole 56, rotation pin passageway 42 and into rotation pin seat 26. Frictional force between rotation pin passageway 42 and rotation pin 50 keeps rotation pin 50 firmly in position. A rotation knob 60 (FIG. 1) is then secured to the end of rotation pin 50 that extends exteriorly of mirror housing 12 to allow the user to rotate rotation pin 50 to move dual element mirror 14. In use, a user can position dual element mirror 14 with either first reflecting element 44 or second reflecting element 46 facing out of mirror opening 38. The user would typically orient dual element mirror 14 with first reflecting element 44 directed outward during the day and second reflecting element 46 directed outward at night.

Figure 4:
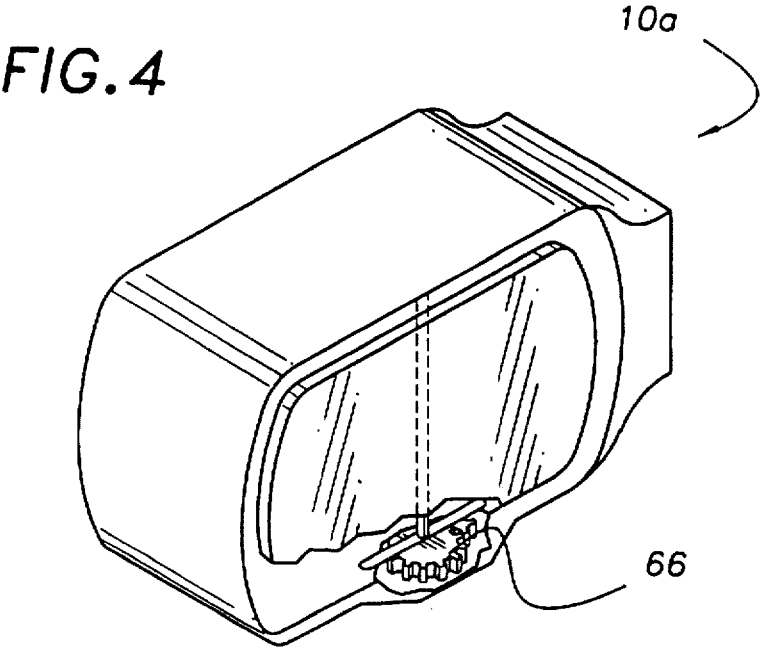
FIG. 4 is a perspective view of a second exemplary embodiment of the dual reflective element vehicle side view mirror assembly of the present invention having a motor driven mirror positioning mechanism.

FIG. 4 shows a second exemplary embodiment of the mirror assembly of the present invention generally designated by the numeral 10a. Mirror assembly 10a is identical to mirror assembly 10 except for replacing rotation knob 60 with an electric motor driven rotation mechanism 66.

It can be seen from the preceding description that a dual reflective element vehicle side view mirror assembly has been provided that includes a conventional reflective element and a tinted reflective element and that includes a reflective element positioning mechanism for allowing the user to conveniently change between a tinted reflective element and a conventional reflective element.

It is noted that the embodiment of the dual reflective element vehicle side view mirror assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A dual reflective element vehicle side view mirror assembly comprising:

a mirror housing having a rotation cavity formed therein in connection with a mirror opening, said mirror housing further including a rotation pin aperture and a rotation pin seat, said rotation pin aperture being formed entirely through a sidewall of said mirror housing opposite from a mirror housing sidewall into which said rotation pin seat is formed, said rotation pin seat and said rotation pin aperture being concentrically aligned, formed adjacent to a perimeter of said mirror opening, and centered along said mirror opening;

a dual element mirror having a first surface having a first reflective element thereon and a second surface opposite to and parallel with said first surface having a second reflective element thereon that is covered by a tinted transparent material, said dual element mirror including a central support plate having a centered rotation pin passageway formed therethrough, said first and second reflective elements being attached to said central support plate; and a mirror positioning mechanism including an elongated rotation pin in connection with said dual element mirror for rotating said dual element mirror from a first position to a second position, said elongated, rotation pin being positioned through said rotation pin aperture of said mirror housing, through said rotation pin passageway of said central support plate and into said rotation pin seat in a manner such that said dual element mirror is rotatable on said rotation pin;

said mirror opening being sized to allow said dual element mirror to be placed there across in a manner such that a gap exists between an entire perimeter edge of said housing defining said mirror opening and a perimeter side edges of said dual element mirror, said rotation cavity being sized to allow said dual element mirror to rotate at least one-hundred eighty degrees about an axis positioned across said mirror opening;

said mirror housing further includes including a pair of spaced registration cavities, one positioned on either side of said rotation pin aperture;

said mirror positioning mechanism further including a registration plate secured to said central support plate having a rotation pin hole for allowing said rotation pin to be passed therethrough and into said rotation pin passageway and two spaced registration bumps on either side of said rotation pin hole, said registration bumps being spaced such that each registration bump is positioned within one of said registration cavities said mirror housing when said dual element mirror is rotated on said rotation pin to a first position, said registration bumps positioned within said registration cavities holding said dual element mirror in said first position.

2. The dual reflective element vehicle side view mirror assembly of claim 1, wherein:

said first reflective element is adhesively secured to a flat side surface of said central support plate.

3. The dual reflective element vehicle side view mirror assembly of claim 2 wherein:

said rotation pin is provided with a knob at one end thereof.

4. The dual reflective element vehicle side view mirror assembly of claim 2 wherein:

said first reflective element is a flat, silvered mirror; and said second reflective element is a flat, silvered mirror formed from a section of tinted glass.

5. The dual reflective element vehicle side view mirror assembly of claim 2, wherein:

said mirror housing is molded from plastic.

6. The dual reflective element vehicle side view mirror assembly of claim 5 wherein:

said first reflective element is a flat, silvered mirror; and said second reflective element is a flat, silvered mirror formed from a section of tinted glass.

7. The dual reflective element vehicle side view mirror assembly of claim 5 wherein:

said rotation pin is provided with a knob at one end thereof.

8. The dual reflective element vehicle side view mirror assembly of claim 7 wherein:

said first reflective element is a flat, silvered mirror; and said second reflective element is a flat, silvered mirror formed from a section of tinted glass.

9. The dual reflective element vehicle side view mirror assembly of claim 1, wherein:

said mirror housing is molded from plastic.

10. The dual reflective element vehicle side view mirror assembly of claim 1 wherein:

said rotation pin is provided with a knob at one end thereof.

11. The dual reflective element vehicle side view mirror assembly of claim 1 wherein:

said first reflective element is a flat, silvered mirror; and said second reflective element is a flat, silvered mirror formed from a section of tinted glass.

\* \* \* \* \*